(12) United States Patent
DeWall et al.

(10) Patent No.: US 8,156,822 B2
(45) Date of Patent: Apr. 17, 2012

(54) FORCE MEASURING VALVE ASSEMBLIES, SYSTEMS INCLUDING SUCH VALVE ASSEMBLIES AND RELATED METHODS

(75) Inventors: Kevin George DeWall, Pocatello, ID (US); Humberto Enrique Garcia, Idaho Falls, ID (US); Michael George McKellar, Idaho Falls, ID (US)

(73) Assignee: Bettelle Energy Alliance, LLC, Idaho Falls, ID (US)

( * ) Notice: Subject to any disclaimer, the term of this patent is extended or adjusted under 35 U.S.C. 154(b) by 211 days.

(21) Appl. No.: 12/628,267

(22) Filed: Dec. 1, 2009

(65) Prior Publication Data

US 2011/0126637 A1     Jun. 2, 2011

(51) Int. Cl.
*G01F 1/28* (2006.01)
(52) U.S. Cl. .................................................. 73/861.75
(58) Field of Classification Search ............... 73/861.75; 137/899.4; 132/41.1
See application file for complete search history.

(56) References Cited

U.S. PATENT DOCUMENTS

| | | | | |
|---|---|---|---|---|
| 3,731,537 A | * | 5/1973 | Trageser | 73/382 R |
| 4,333,427 A | * | 6/1982 | Burillo et al. | 123/190.2 |
| 4,428,242 A | * | 1/1984 | Holstrom | 73/861.75 |
| 4,926,903 A | * | 5/1990 | Kawai | 137/554 |
| RE33,649 E | | 7/1991 | Kawai | |
| 5,696,318 A | * | 12/1997 | Ernst et al. | 73/114.36 |
| 6,837,193 B2 | * | 1/2005 | Kobayashi et al. | 123/41.1 |
| 6,957,801 B2 | * | 10/2005 | Wilfert et al. | 251/129.04 |
| 7,178,783 B2 | | 2/2007 | Tuin et al. | |
| 7,364,006 B2 | * | 4/2008 | Birsching et al. | 180/441 |
| 7,424,937 B2 | | 9/2008 | Henry et al. | |
| 7,604,023 B2 | * | 10/2009 | Buckner et al. | 137/899.4 |
| 2008/0034882 A1 | | 2/2008 | Ohta et al. | |

* cited by examiner

*Primary Examiner* — Jewel V Thompson
(74) *Attorney, Agent, or Firm* — Traskbitt

(57) ABSTRACT

Methods of evaluating a fluid condition may include stroking a valve member and measuring a force acting on the valve member during the stroke. Methods of evaluating a fluid condition may include measuring a force acting on a valve member in the presence of fluid flow over a period of time and evaluating at least one of the frequency of changes in the measured force over the period of time and the magnitude of the changes in the measured force over the period of time to identify the presence of an anomaly in a fluid flow and, optionally, its estimated location. Methods of evaluating a valve condition may include directing a fluid flow through a valve while stroking a valve member, measuring a force acting on the valve member during the stroke, and comparing the measured force to a reference force. Valve assemblies and related systems are also disclosed.

20 Claims, 5 Drawing Sheets

FORCE MEASURING VALVE ASSEMBLIES, SYSTEMS INCLUDING SUCH VALVE ASSEMBLIES AND RELATED METHODS

GOVERNMENT RIGHTS

This invention was made with government support under Contract Number DE-AC07-05ID14517 awarded by the United States Department of Energy. The government has certain rights in the invention.

BRIEF SUMMARY

In some embodiments, a method of evaluating a fluid condition may include stroking a valve member and measuring a force acting on the valve member during the stroke.

In additional embodiments, a method of evaluating a fluid condition may include measuring a force acting on a valve member over a period of time and evaluating at least one of the frequency of changes in the measured force over the period of time and the magnitude of the changes in the measured force over the period of time to identify the presence of an anomaly in a fluid flow.

In further embodiments, a method of evaluating a valve condition may include directing a fluid flow through a valve while stroking a valve member, measuring a force acting on the valve member during the stroke, and comparing the measured force to a reference force.

In yet further embodiments, a valve assembly may include a valve member, an actuator, a first sensor, a second sensor, and a controller. The actuator may be coupled to the valve member and the first sensor may be configured to measure a force acting on the valve member. The second sensor may be configured to measure a position of the valve member and the controller may be coupled to the actuator, the first sensor and the second sensor. The controller may be programmed and configured to cause the actuator to stroke the valve member and receive data from the first sensor and the second sensor as the valve member is stroked, analyze the data received to determine a new valve member position, and cause the actuator to position the valve member to the new valve member position. As used herein, the term "data" is non-limiting, and may include, as a non-limiting example, digital signals, analog signals, and voltage signals, and may correlate directly to a measured value or may be a processed signal, such as by a filter, and may be merely indicative of a measured value, a value change or trend, a value range, etc.

In additional embodiments, a fluid flow system may include a plurality of valve assemblies, each valve assembly of the plurality of valve assemblies having a valve member. The fluid flow system may also include a sensor, a controller and an actuator, the sensor configured to measure a force acting on the valve member as the valve member is stroked by the actuator, and the controller programmed and configured to receive the measured force value and evaluate at least one fluid condition.

DETAILED DESCRIPTION

Figure 1:
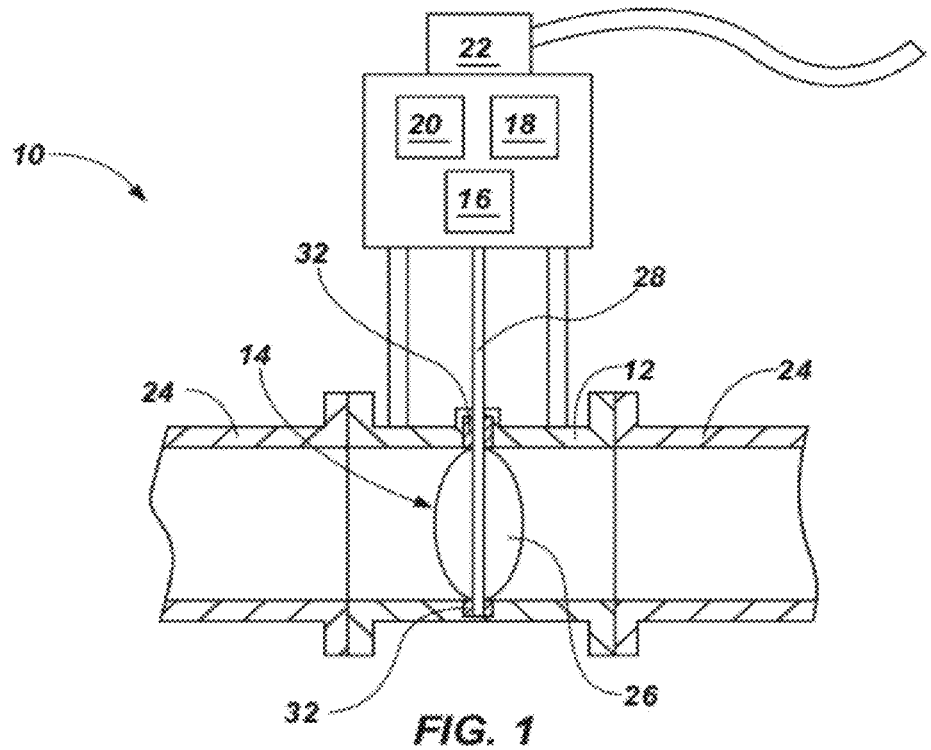
FIG. 1 shows a partial cross-sectional view of a valve assembly according to an embodiment of the present invention.

In some embodiments, as shown in FIG. 1, a valve assembly 10 may include a valve body 12, a valve member 14, a valve actuator 16, one or more sensors 18 and 20 and a controller 22. The valve body 12 may be coupled with a fluid conduit, such as a pipeline 24, and may provide a fluid pathway through the valve assembly 10. The valve member 14 may be positioned within the valve body 12 and may be movable between a fully open position and a fully closed position by the actuator 16 and may be utilized to vary the size of an opening through the valve body 12.

Figure 8:
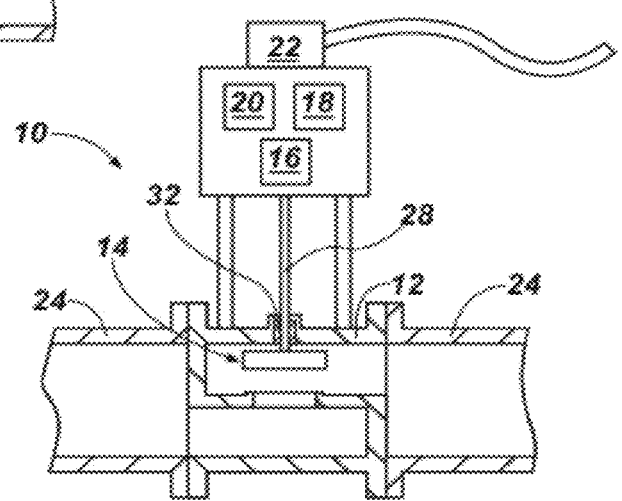
FIG. 8 shows a partial cross-sectional view of a valve assembly including a globe-type valve, according to an embodiment of the present invention.
Figure 9:
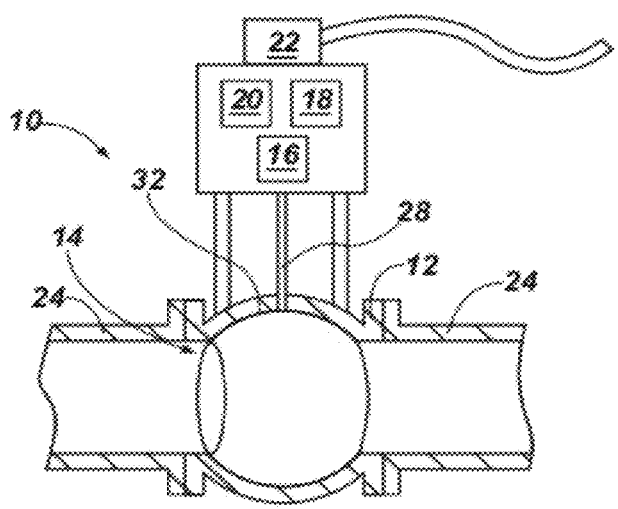
FIG. 9 shows a partial cross-sectional view of a valve assembly including a ball-type valve, according to an embodiment of the present invention.

In some embodiments the valve assembly 10 may be configured as a butterfly valve and the valve member 14 may comprise a disc member 26 coupled to a shaft 28 (i.e., a valve stem), the disc member 26 configured to seal against a seat 30 (FIG. 2) of the valve body 12. The shaft 28 may extend through the valve body 12 and may extend to the actuator 16, which may include a force transferring device, such as one or more of an electric motor, a servomotor, a stepper motor, a pneumatic motor, a hydraulic motor, a linear motor, a pneumatic ram, a hydraulic ram, a pneumatic diaphragm, a hydraulic diaphragm and an electric solenoid, coupled to the shaft 28 and configured to rotate the shaft 28 and the disc member 26 coupled thereto. As used herein, the term "force transferring device" is a broad term and includes devices that generate a force by converting power (i.e., electric current, fluid flow, fluid pressure, heat, potential energy and kinetic energy) to a force as well as devices that transfer a force applied thereto. In additional embodiments, a valve assembly may be configured as another type of valve and the valve member 14 may be another type of valve member 14, such as one of a gate for a gate-type valve (FIG. 7), a plug for a globe-type valve (FIG. 8), and a ball for a ball-type valve (FIG. 9).

The sensor 18 may be utilized to measure a force acting on the valve member 14, such as one or more of a torque, a shear force, a tensile force and a compression force. As used herein, the term "a force" is non-limiting, and encompasses measurement of more than one force, and measurement of the same force in a plurality of ways. In some embodiments, the valve member 14 may be coupled directly to the sensor 18, which may comprise a device such as a potentiometer, rheostat, a strain gage or some other sensor. In additional embodiments, the sensor 18 may be coupled indirectly to the sensor, for example, the sensor 18 may be coupled to the actuator 16 and the sensor 18 may be a device such as an amp meter or some other sensor. In some embodiments, the sensor 18 may include one or more power sensors (i.e., power utilized by the actuator 16), such as one or more of an amp meter (i.e., coupled to an electric actuator 16), a pressure transducer (i.e., coupled to a pneumatic or hydraulic actuator 16), and a torque gauge. In further embodiments, the sensor 18 may include one or more load sensors (i.e., load experienced by one or more of the valve member 14 and the actuator 16), such as one or more of a strain gage, a load cell, a torque cell, and a piezoelectric device.

For a non-limiting example, the sensor 18 may be an amp meter electrically coupled to the motor of the actuator 16 and may detect the electrical power used by the motor to stroke (i.e., rotate) the valve member 14. In operation, the actuator 16 may stroke the valve member 14, such as by rotating the shaft 28 and the disc member 26, and the sensor 18 may detect the amount of force acting on the valve member 14, such as by detecting the amount of electrical power that is required to stroke the valve member 14.

Additionally, the valve assembly 10 may include a position sensor 20 positioned and configured to measure the position (i.e., one or more of a linear position and an angular position) of the valve member 14. In some embodiments, the position sensor 20 may comprise one or more of a potentiometer, a rheostat, a servomotor, a stepper motor, a rotary encoder, a linear encoder a servomechanism or another device. For example, the position sensor 20 may measure the angular position α (FIG. 2) of the valve member 14. The position sensor 20 may be used to measure a position of the valve member 14 to correspond to each force measured by the sensor 18, and the measured position data and force data may then be correlated and stored in computer readable media, such as by the controller 22.

The valve member 14 may be acted on by several different forces. For example, components of the valve assembly 10, such as bearing components, seals, packings, etc., collectively designated by reference numeral 32, may apply a force to the valve member 14, such as frictional forces, as the valve member 14 is stroked, and fluid flowing through the valve body 12 may also apply a force to the valve member 14. Forces acting on the valve member 14 that are exerted by the interaction between the valve member 14 and other components of the valve assembly 10 may be termed "intrinsic forces," and other forces acting on the valve member 14, such as pressure forces resulting from a fluid flow past the valve member 14, may be termed "extrinsic forces."

Figure 2:
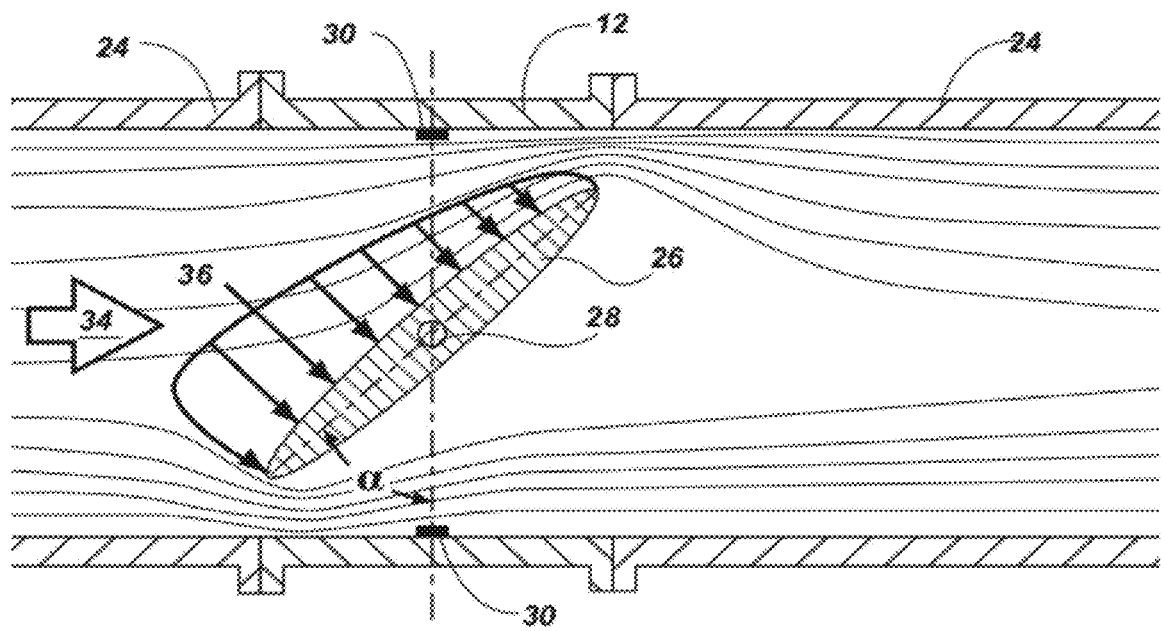
FIG. 2 shows a cross-sectional view of a valve member of a valve assembly, such as shown in FIG. 1, in a fluid flow.

As shown in FIG. 2, a fluid flow having an average fluid flow path indicated by streamlines and having an average flow direction indicated by an arrow 34 may be directed through the valve body 12. The extrinsic force exerted on the valve member 14 may vary according to velocity of the fluid flow, the position of the valve member 14 relative to the fluid flow, and properties of the fluid, such as mass and viscosity. For example, as shown in FIG. 2, the valve member 14 may include a disc member 26 that may experience a force from a fluid flow similarly to a wing of an airplane in an airflow. The valve member 14 may experience extrinsic forces acting thereon that may vary according to the particular fluid flow and also according to the angular position α (i.e., angle of attack) of the valve member 14 relative to the average flow direction 34. As shown, the angular position α may be calculated relative to a closed position, which may be generally perpendicular to the average flow direction 34. The flowing fluid may apply a pressure force 36, such as a non-uniform pressure force, to the valve member 14, such as to an upstream oriented face of the valve member 14. In embodiments wherein the valve member 14 includes the disc member 26 of a butterfly valve, as shown in FIG. 2, the force may be greater on the portion of the disc member 26 at one side of the shaft 28 relative to a portion of the disc member 26 at another side of the shaft 28 and a torque on the shaft 28 may result. In some embodiments, such a torque on the shaft 28 may be measured by the sensor 18.

Figure 3:
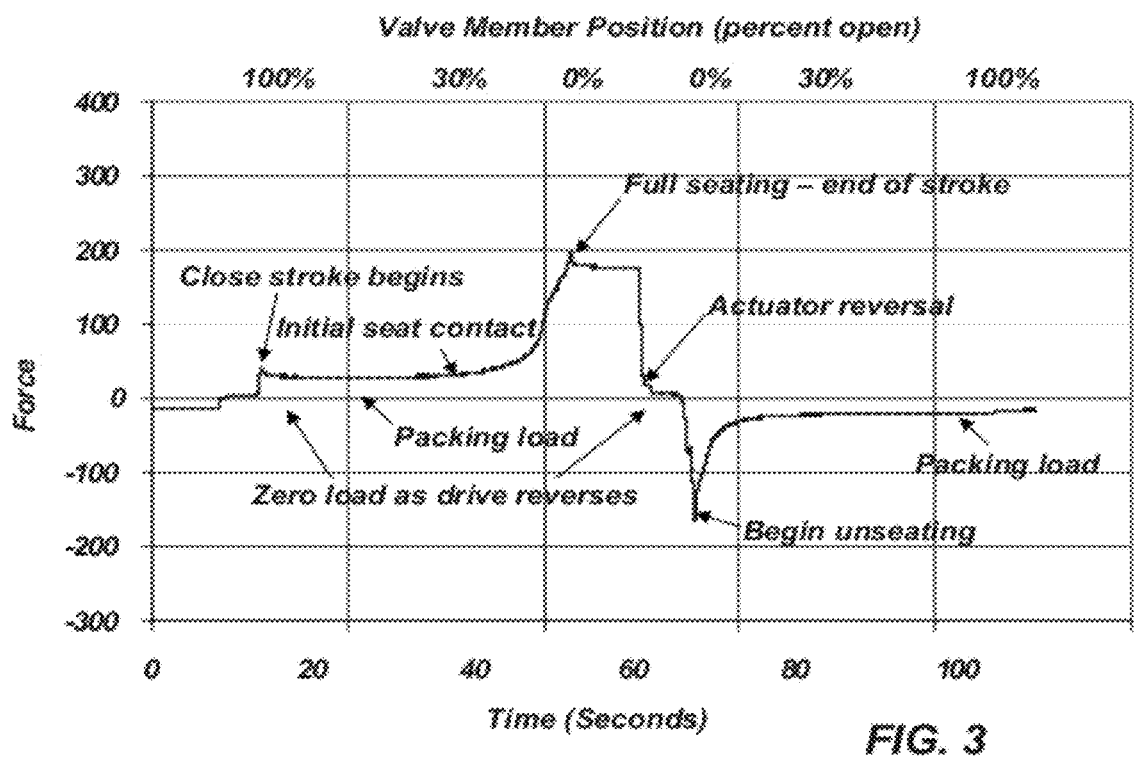
FIG. 3 shows a graph showing a measured force on a valve member, such as the valve member shown in FIG. 2, over a stroke cycle of the valve member outside of the presence of a fluid flow.

As shown in FIG. 3, as the disc member 26 for the butterfly valve (FIG. 2) strokes through a complete cycle from fully open to fully closed and back to fully open, the intrinsic load (i.e., no significant fluid pressure gradient present across the valve and no significant fluid flow present), as measured by the sensor 18 coupled to the actuator 16, varies throughout the complete stroke cycle. As the stroke cycle begins (from a fully opened position) a small spike in the measured force may be observed, such as from one or more of inertial forces and friction forces. As the valve member 14 continues to stroke, the force may remain relatively constant, which may result from relatively constant friction forces imparted on the valve member 14 by the various packing, seal, and bearing components 32 of the valve assembly 10. As the valve member 14 begins to contact the seat 30 the forces imparted on the valve member 14 may continually increase, peaking when the valve member 14 becomes fully seated and the valve member 14 is positioned in a fully closed position. The actuator 16 may then be reversed to complete the cycle. The measured force may be zero as the actuator reverses and the measured force may peak again as the valve member 14 begins to become unseated. The measured force may continually decrease as the valve member 14 is removed from contact from the seat 30 and then the measured force may become relatively constant as the valve member 14 strokes back to the original, fully open position.

Figure 4:
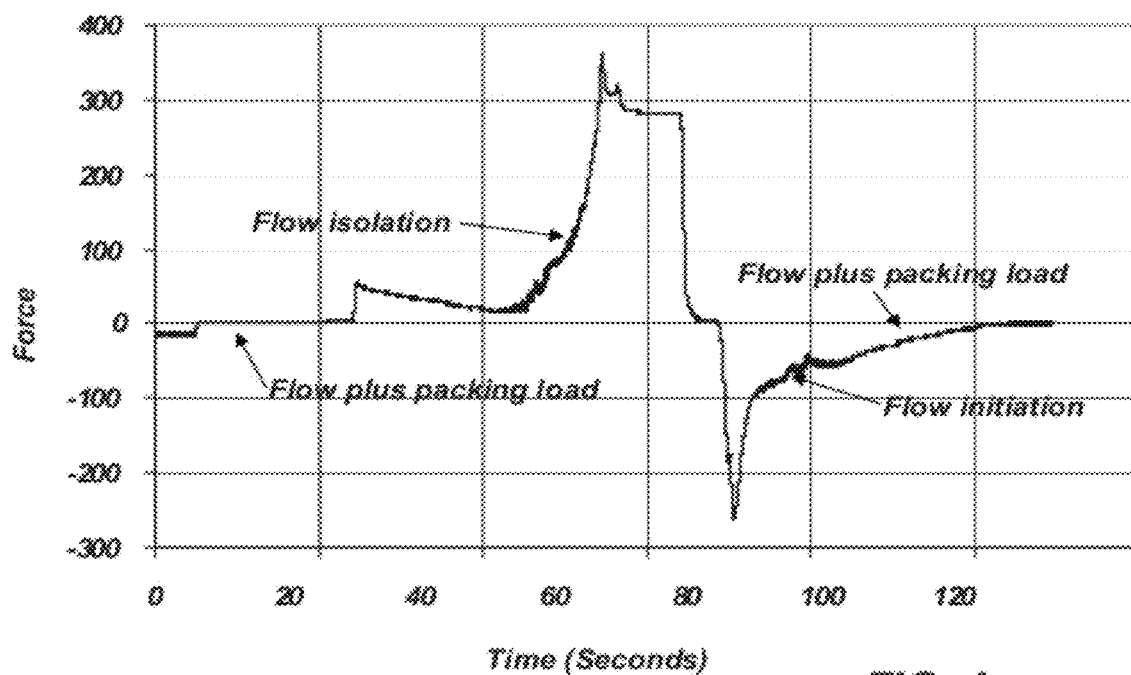
FIG. 4 shows a graph of a measured force on the valve member of FIG. 3 over the stroke cycle of the valve member in the presence of a fluid flow.

When a fluid pressure gradient across the valve member 14 is introduced, which may result from a fluid flow, the total load of the valve member 14 may be measured by the sensor 18, including intrinsic and extrinsic forces acting on the valve member 14, such as a total torque load measured in inch-pounds as shown in FIG. 4. FIG. 4 shows a full cycle for the valve member 14, from fully open to fully closed and back to fully open, in the presence of a fluid pressure gradient that may result in a water flow of about 300 gallons per minute through the valve body 12 when the valve member 14 is in a fully open position.

In some embodiments, the valve member 14 may be stroked through an entire cycle outside of the presence of any significant fluid pressure gradient or fluid flow and a unique intrinsic force signature, such as shown in FIG. 3, may be generated for the valve assembly 10. In other words, intrinsic force data for a valve assembly 10 may be collected by the sensor 18 over a stroke cycle and the collected intrinsic force data (i.e., the intrinsic force signature) may be stored, such as on a computer readable media (i.e., memory of the controller 22).

The position of the valve member 14 may also be measured, such as by the position sensor 20, and the position of the valve member 14 corresponding to each measured force may be included with the intrinsic force signature. The position of the valve member 14 may also be measured during a stroke of the valve member 14 within a fluid pressure gradient and each total measured force on the valve member 14 may be correlated to a position of the valve member 14. The force applied to the valve member 14 by extrinsic forces, such as by a fluid pressure, may then be determined by correlating the intrinsic force signature and the total measured force, such as with the controller 22. For example, for each position where a total force is measured the intrinsic force may be subtracted from the total force and the extrinsic force may be determined. Additionally, the intrinsic forces acting on the valve member 14 may be remeasured to generate a new intrinsic force signature for calibration purposes at any time, such as at scheduled time intervals, at measured flow volume intervals or mass flow intervals, or if the temperature of the valve assembly 10 changes outside of a given range. In view of this, if the intrinsic forces of the valve assembly 10 change, such as due to wear or environmental factors, the change in intrinsic force may be accounted for and a relatively accurate extrinsic force measurement may be determined from a total force measurement.

Figure 5:
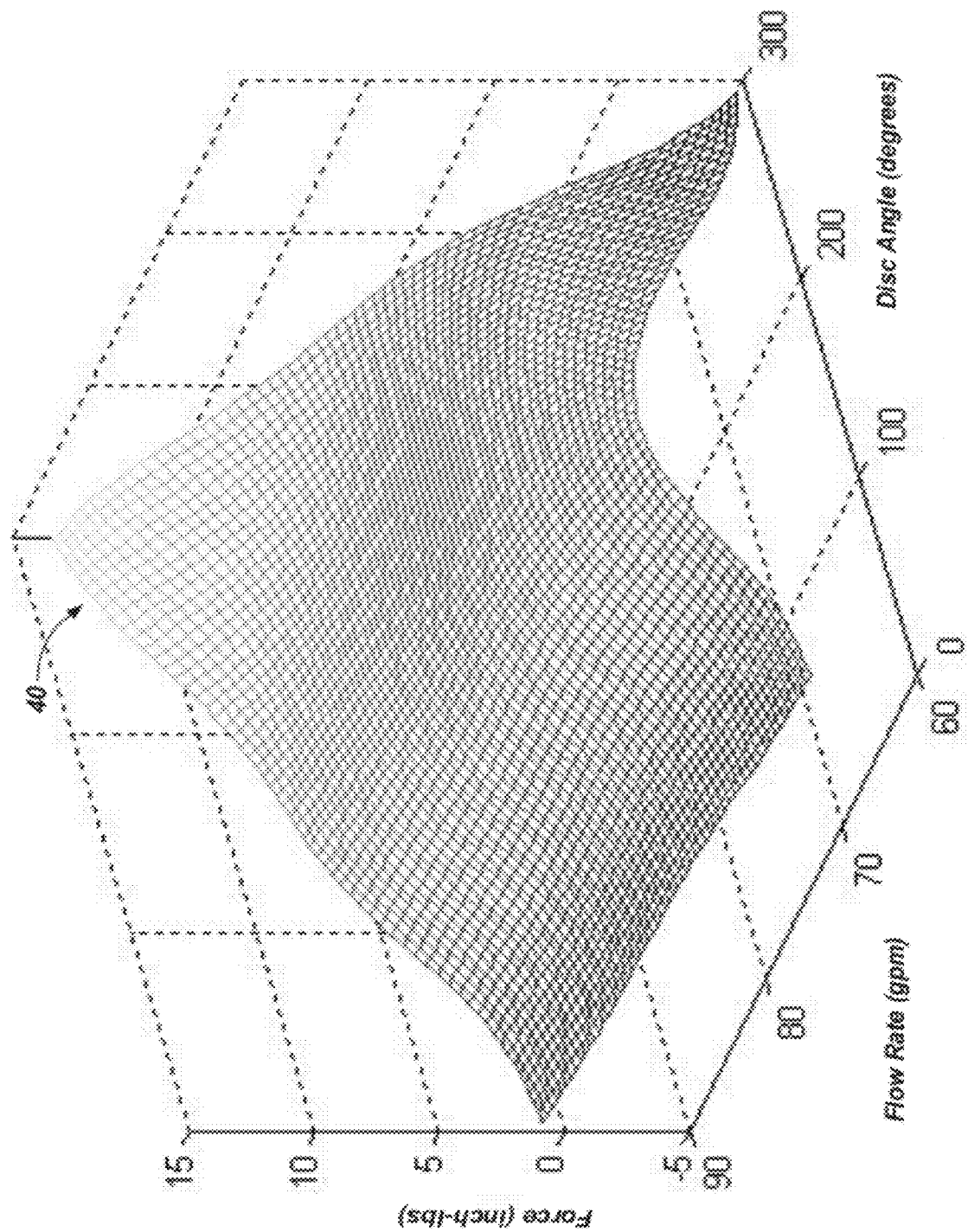
FIG. 5 shows a graph of a model represented by a surface correlating a valve position and measured force acting on a valve member, such as the valve member shown in FIG. 2, to a fluid condition.

A model may be generated, such as is represented by a surface 40 shown in FIG. 5, which may be utilized to determine a fluid condition, such as one or more of an average change in fluid pressure across the valve member 14, a flow rate through the valve body 12 and other fluid conditions. The model may be generated by measuring the forces acting on the valve member 14, or a valve member 14 of a similar valve assembly 10, while cycling the valve member 14, such as between fully opened to fully closed positions, at known flow conditions, by computer modeling and simulations, by mathematical models or by other methods. In some embodiments, the model may correlate the position of the valve member 14, the extrinsic load on the valve member 14 and a flow condition. In additional embodiments, the model may correlate the position of the valve member 14, the total load on the valve member 14 and a flow condition. In such embodiments where the model correlates a total load on the valve member 14, a valve signature may not be stored and used and an extrinsic load may not be determined; rather, total load measurements on the valve member 14 over a range of positions of the valve member 14 may be correlated with the model to determine a flow condition.

In some embodiments, as shown in FIG. 5, a model may be generated for a valve and the model may correlate the angle of the disc member 26, the extrinsic force on the disc member 26 and the flow rate of a fluid through the valve body 12 (see FIGS. 1 and 2).

In operation, total force measurements may be recorded over an entire stroke cycle, a relatively short stroke or another intermediate stroke. A relatively short stroke of the valve member 14 may enable a number of total force measurements to be collected over a range of positions of the valve member 14 while having a relatively insubstantial effect on a fluid flow through the valve body 12. For a non-limiting example, the valve member 14 may be stroked about 5% of the total stroke range of the valve member 14 (e.g., the butterfly valve having the disc member 26 with a quarter-turn (90 degree) total stroke range may be stroked about 4.5 degrees). Subsequently, the valve member 14 may then be stroked back to the previous position of the valve member 14. The total force measurements may then be converted to extrinsic force measurements by utilizing a computer, such as the controller 22, to calculate the difference between the total force and intrinsic force data of the stored intrinsic force signature. The calculated extrinsic force data may then be compared to the model with the controller 22 to determine a corresponding fluid condition. Additionally, the controller 22 may be programmed and configured to cause the actuator 16 to move the valve member 14 in response to an identified fluid condition. For example, the controller 22 may cause the valve actuator 16 to move the valve member 14 to a closed position upon determining a fluid flow condition exceeding a predetermined flow rate threshold.

The controller 22 of the valve assembly 10, or optionally a computer in communication therewith, may also utilize data and trends in data over time, such as forces acting on the valve member 14 or other operating characteristics to evaluate the condition of components of the valve assembly 10 and signal a potential requirement for maintenance or predict when maintenance may be needed. For example, the controller 22 may evaluate forces associated with seating and unseating the valve member 14 and may evaluate forces associated with friction between the packing, seals and bearing components 32 and the shaft 28.

The sensor 18 may be utilized to substantially continuously measure forces acting on the valve member 14. In view of this continuous monitoring, the presence of system anomalies, such as irregular fluid flow conditions, may be identified relatively quickly after an anomaly occurs.

In some embodiments, fluctuations in the forces acting on the valve member 14 may be analyzed. For example, the controller 22 may evaluate one or more of the frequency and the amplitude of cyclic fluctuations of the measured forces acting on the valve member 14. Such cyclic fluctuations of forces acting on the valve member 14 may appear as noise in the data gathered; however, an analysis of such fluctuations may indicate system or flow anomalies, such as one or more of fluid cavitation, turbulent flow, flow obstructions, system leaks and other system and flow anomalies. Additionally, the valve member 14 may be repositioned in response to a detected anomaly in order to gather additional data to facilitate an accurate evaluation and an appropriate response, if required or desirable, to the anomaly.

Figure 6:
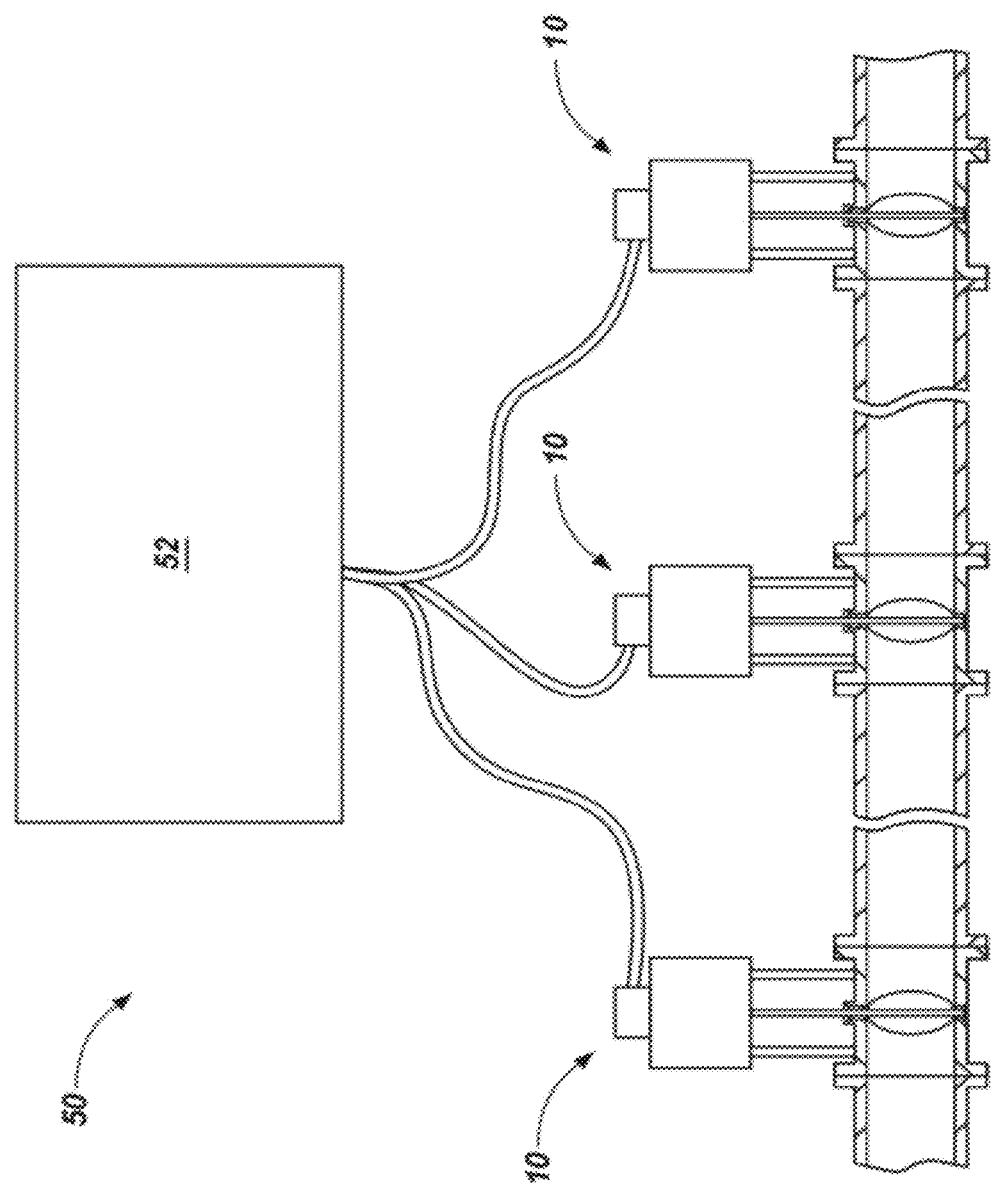
FIG. 6 shows a partial cross-sectional view of a fluid flow system comprising a plurality of valve assemblies, such as shown in FIG. 1.

In some embodiments, a system 50 may include a plurality of valve assemblies 10 that may be in communication with other valve assemblies 10 of the plurality of valve assemblies 10 and may be in communication with a central control station 52, such as a control room computer, as shown in FIG. 6. With such a system 50, the plurality of valve assemblies 10 may each identify anomalies, share data collected by each valve assembly, determine the location of an anomaly within the system 50 and determine the magnitude of an anomaly. In some embodiments, the location of an anomaly occurring between two valve assemblies 10 may be determined by comparing the magnitude of an anomaly signal measured by each of the two valve assemblies 10. For example, the anomaly may be nearer to a valve assembly 10 that receives an anomaly signal having a relatively greater magnitude. Additionally, the greater the difference between the magnitude of the anomaly signals measured by the two valve assemblies 10, the closer the anomaly may be to the valve assembly 10 measuring the greater magnitude anomaly signal. Additionally, in some embodiments, the fluid flow conditions of the system 50 may be monitored solely by the plurality of valve assemblies 10, and the system 50 need not include other sensors for detecting fluid flow conditions.

Each valve assembly 10 may be configured to react to an identified anomaly signal. For example, each valve assembly 10 may be configured to position the valve member 14 (FIG. 1) to a more open position when an upstream overpressurization is detected or to a more closed position when a downstream leak is detected, such as may be detected by measuring a deviation from an expected (i.e., predetermined) fluid condition. Additionally, the valve assemblies 10 may be configured to send signals, such as with the controller 22 (FIG. 1), to the central control station 52 for monitoring, such as by one or more of a human operator and a primary computer. The valve assemblies 10 may also be configured to receive commands, such as with the controller 22, from the central station 52, such as from one or more of a human operator and a primary computer. In embodiments including a configuration with at least some autonomous valve control and central control, anomalies may be initially addressed relatively quickly by the valve assemblies 10, and consequences of system changes may be observed and overridden by the central control station 52, if needed. Additionally, such embodiments may be configured to operate with little or no human intervention; rather, as the system 50 is monitored at least in part by the valve assemblies 10, the valve assemblies 10 may be configured to react to measured data and from data received from one or more of other valve assemblies 10 and the central control station 52. For example, each controller 22 of each valve assembly 10 may be programmed to react to certain measured data autonomously, that is, the sensor 18 may measure forces acting on the valve member 14, the controller 22 may analyze the measured data and respond according to a preprogrammed set of instructions, such as by directing the valve actuator 16 to move the valve member 14 to a new position. Additionally, the controller 22 for each valve assembly 10 may receive data or signals from the controllers 22 of other valve assemblies 10 or a central control station 52 and may respond according to a preprogrammed set of instructions, such as by directing the valve actuator 16 to move the valve member 14 to a new position. Of course, controllers 22 may be programmed to cause their respective valve members 14 to revert to a default or fail-safe position upon receipt of data or other signals outside of a certain range or a certain frequency of occurrence, to prevent cascading, unwanted manipulation of valve members 14 by their associated controllers 22 and potential system failure. Such programming would also be associated with alarm signals to the central control station 52 for initiation of automated or operator-directed control override.

Any number of conventional valve types may be configured and utilized for the valve assembly 10 as described herein. For example, a butterfly-type valve may be utilized as shown in FIGS. 1 and 2. Additionally, one or more of a gate-type valve (FIG. 7), a globe-type valve (FIG. 8), and a ball-type valve (FIG. 9) may be utilized. If a gate-, globe-, or ball-type valve is utilized, the valve assembly may be configured with a sensor 18, such as a strain gage, positioned and configured to measure a strain on the valve member 14, such as the valve stem. Additionally, in some embodiments, the valve assembly 10 may include a butterfly valve configured to exhibit increased torque effects on the shaft 28 as a result of extrinsic forces from fluid flows acting on the disc member 26; unlike a conventional butterfly valve that may be configured to minimize torque effects resulting from extrinsic forces from fluid flows.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the scope of the invention as defined by the following appended claims.

What is claimed is:

1. A method of evaluating a fluid condition, comprising:
   stroking a valve member during a presence of fluid flow therepast;
   measuring total forces acting on the valve member during the stroke and over a range of travel;
   correlating stored intrinsic forces for the range of travel to the measured total forces over the range of travel to determine extrinsic forces acting on the valve member over the range of travel; and
   correlating the determined extrinsic forces acting on the valve member over the range of travel to a model to determine at least one fluid condition.

2. The method of claim 1, further comprising:
   measuring forces acting on the valve member during a stroke outside of the presence of a fluid flow therepast to determine intrinsic forces acting on the valve member during the stroke; and
   storing the determined intrinsic forces acting on the valve member on a non-transitory computer readable storage media.

3. The method of claim 1, wherein measuring total forces acting on the valve member during the stroke and over a range of travel comprises measuring the power used by an actuator while the actuator strokes the valve.

4. The method of claim 1, wherein measuring total forces acting on the valve member during the stroke and over a range of travel comprises measuring a torque acting on the valve member during the stroke and over the range of travel.

5. The method of claim 1, further comprising:
   measuring a position of the valve member as the valve member is stroked and correlating the measured position of the valve member with each measured force over the stroke.

6. The method of claim 1, wherein stroking the valve member comprises rotating the valve member.

7. The method of claim 6, wherein rotating the valve member comprises rotating the valve member at least about 4.5 degrees.

8. The method of claim 1, further comprising:
   automatically moving the valve member to a new position in response to the measured total forces.

9. A method of evaluating a fluid condition, comprising:
   measuring a force acting on a valve member in the presence of a fluid flow over a period of time; and
   evaluating at least one of a frequency of changes in the measured force over the period of time and a magnitude of the changes in the measured force over the period of time to identify the presence of an anomaly in a fluid flow.

10. The method of claim 9, further comprising:
    measuring a force acting on at least one other valve member of another valve assembly in the presence of the fluid flow over the period of time;
    comparing the measured forces acting on the valve member and the at least one other valve member over the period of time to determine a location of the anomaly in the fluid flow.

11. The method of claim 9, wherein measuring a force acting on a valve member over a period of time further comprises substantially continuously measuring the force acting on the valve member.

12. A method of evaluating a valve condition, comprising:
    measuring a force acting on a valve member while stroking the valve member without fluid flowing through a valve comprising the valve member to determine a reference force;
    directing a fluid flow through the valve while stroking the valve member;
    measuring a force acting on the valve member during the stroke while the fluid flow is directed through the valve to determine a measured force; and
    comparing the measured force to the reference force.

13. The method of claim 12, further comprising remeasuring the force acting on the valve member while stroking the valve member without fluid flowing through the valve to determine a new reference force.

14. The method of claim 12, wherein comparing the measured force to the reference force comprises comparing the measured force to a plurality of previously measured forces taken over an interval of time.

15. A valve assembly comprising:
a valve member;
an actuator coupled to the valve member;
a first sensor configured to measure force acting on the valve member and generate corresponding data, the first sensor comprising a power sensor coupled to the actuator and positioned to sense power utilized by the actuator to stroke the valve member;
a second sensor configured to measure position of the valve member and generate corresponding data;
a controller coupled to the actuator, the first sensor and the second sensor, the controller programmed and configured to cause the actuator to stroke the valve member and receive data from the first sensor and the second sensor as the valve member is stroked in a presence of fluid flow therepast, analyze the data received and cause the actuator to position the valve member to a new valve member position responsive at least in part to the data received.

16. The valve assembly of claim 15, wherein the valve member comprises at least one of a disc of a butterfly valve, a globe of a globe valve and a gate of a gate valve.

17. A fluid flow system comprising:
a plurality of valve assemblies, each valve assembly of the plurality of valve assemblies including a valve member, a first sensor, a second sensor, a controller and an actuator, the first sensor configured to measure a force acting on the valve member as the valve member is stroked by the actuator, the second sensor configured to measure a position of the valve member and the controller programmed and configured to receive a value of the measured force and a value of at least one measured position and evaluate at least one fluid condition responsive thereto.

18. The fluid flow system of claim 17, wherein the controller of each valve assembly of the plurality of valve assemblies is configured to communicate with the controller of at least one other valve assembly of the plurality of valve assemblies.

19. The fluid flow system of claim 18, wherein each of the plurality of valve assemblies is configured to automatically and cooperatively change a fluid flow of the system in response to a fluid flow anomaly.

20. The fluid flow system of claim 18, wherein the controller of each valve assembly of the plurality of valve assemblies is configured to communicate with a central control station.

* * * * *

UNITED STATES PATENT AND TRADEMARK OFFICE
CERTIFICATE OF CORRECTION

Page 1 of 2

PATENT NO.         : 8,156,822 B2
APPLICATION NO.    : 12/628267
DATED              : April 17, 2012
INVENTOR(S)        : Kevin George DeWall, Humberto Enrique Garcia and Michael George McKellar It is certified that error appears in the above-identified patent and that said Letters Patent is hereby corrected as shown below:

On the title page:
In ITEM (73) Assignee:　　　　　　　　　　change "Bettelle" to -- Batelle --

In ITEM (74) *Attorney, Agent, or Firm*:　　change "Traskbitt" to -- TraskBritt --

Figure 7:
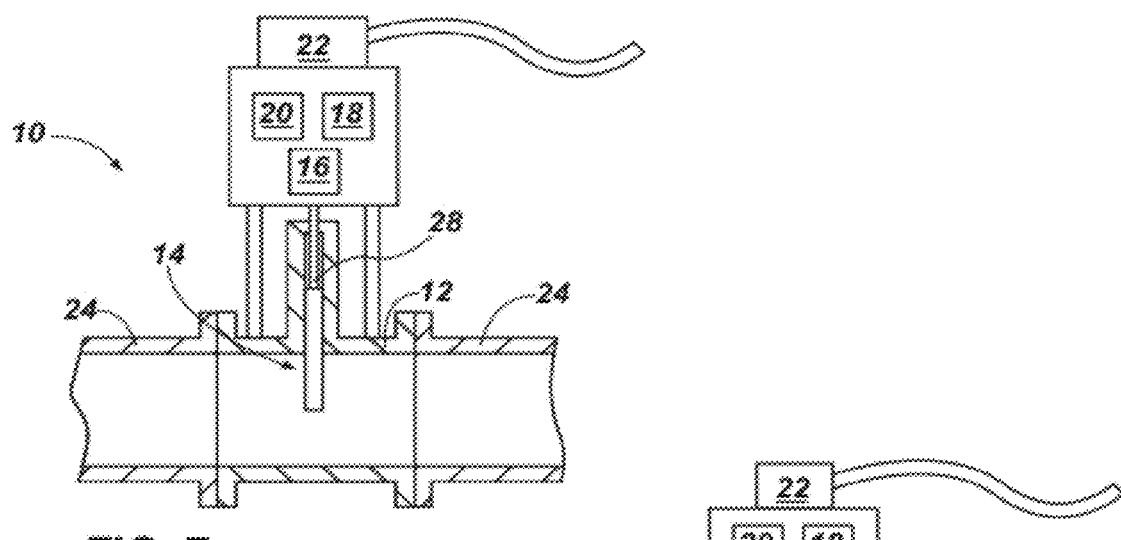
FIG. 7 shows a partial cross-sectional view of a valve assembly including a gate-type valve, according to an embodiment of the present invention.

In the drawings:
　　In FIG. 7,　　　　　　　　　　　　insert reference numeral -- 32 -- to middle portion of
　　　　　　　　　　　　　　　　　　　left-hand side with appropriate lead line

Replace FIG. 7 with the following figure:

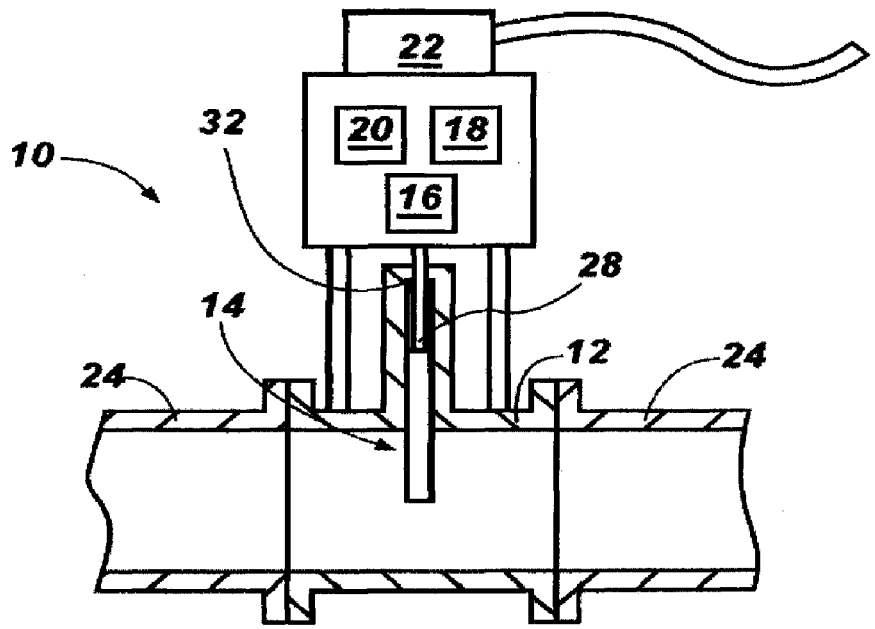

FIG. 7

Signed and Sealed this
Twentieth Day of November, 2012

David J. Kappos
*Director of the United States Patent and Trademark Office*

CERTIFICATE OF CORRECTION (continued)
U.S. Pat. No. 8,156,822 B2

In the specification:

| | | |
|---|---|---|
| COLUMN 6, | LINE 41, | change "valve assembly," to -- valve assembly 10, -- |
| COLUMN 7, | LINE 43, | change "valve assembly" to -- valve assembly 10 -- |

UNITED STATES PATENT AND TRADEMARK OFFICE
CERTIFICATE OF CORRECTION

PATENT NO. : 8,156,822 B2
APPLICATION NO. : 12/628267
DATED : April 17, 2012
INVENTOR(S) : Kevin George DeWall, Humberto Enrique Garcia and Michael George McKellar It is certified that error appears in the above-identified patent and that said Letters Patent is hereby corrected as shown below:

On the title page:
In ITEM (73) Assignee: change "Bettelle" to --Battelle--

Signed and Sealed this
Fourteenth Day of May, 2013

Teresa Stanek Rea
*Acting Director of the United States Patent and Trademark Office*